United States Patent [19]

Brown et al.

[11] 4,108,563
[45] Aug. 22, 1978

[54] LOCKING CONNECTION FOR SUSPENSION CEILING SYSTEMS

[75] Inventors: Donald A. Brown, Westlake; Paul D. LaLonde, Avon Lake; Gerald L. Koski, Parma, all of Ohio

[73] Assignee: Donn Products, Inc., Westlake, Ohio

[21] Appl. No.: 713,287

[22] Filed: Aug. 11, 1976

Related U.S. Application Data

[63] Continuation-in-part of Ser. No. 625,572, Oct. 24, 1975.

[51] Int. Cl.² ............................................. F16B 7/22
[52] U.S. Cl. ....................................... 403/347; 52/667
[58] Field of Search ................ 403/347; 52/664, 667, 52/484, 488, DIG. 5, 499, 573

[56] References Cited

U.S. PATENT DOCUMENTS

| | | | |
|---|---|---|---|
| 3,501,185 | 3/1970 | Brown et al. | 52/664 |
| 3,565,474 | 2/1971 | Stumbo | 52/667 X |
| 3,606,417 | 9/1971 | Rousey | 52/667 X |
| 3,979,874 | 9/1976 | Cubbler et al. | 52/484 X |

*Primary Examiner*—Wayne L. Shedd
*Attorney, Agent, or Firm*—McNenny, Pearne, Gordon, Gail, Dickinson & Schiller

[57] ABSTRACT

A suspension ceiling system having an improved connecting system comprising a pair of similar ends on crossbeam connectors which are received through a single slot opening in a main beam in side-by-side relationship by a straight-in movement. Projections the crossbeam connectors interlock when fully engaged and prevent axial movement in either direction. A tab on each connector holds the first-inserted end in place prior to the insertion of the second connector.

24 Claims, 8 Drawing Figures

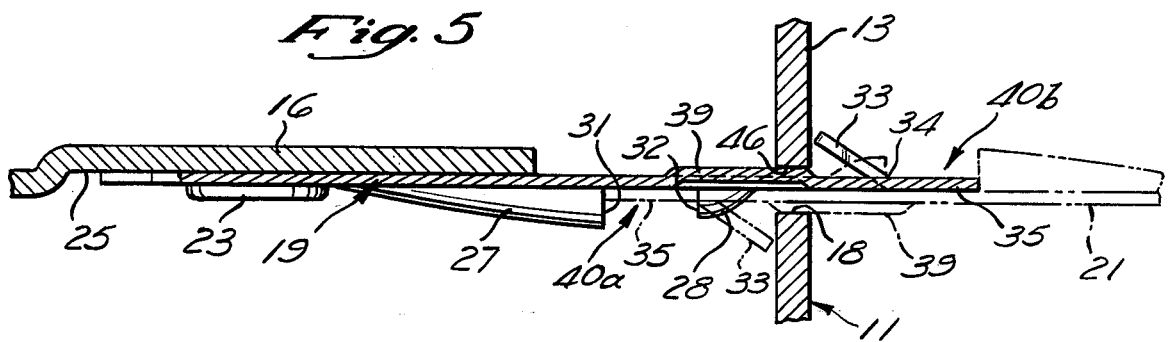
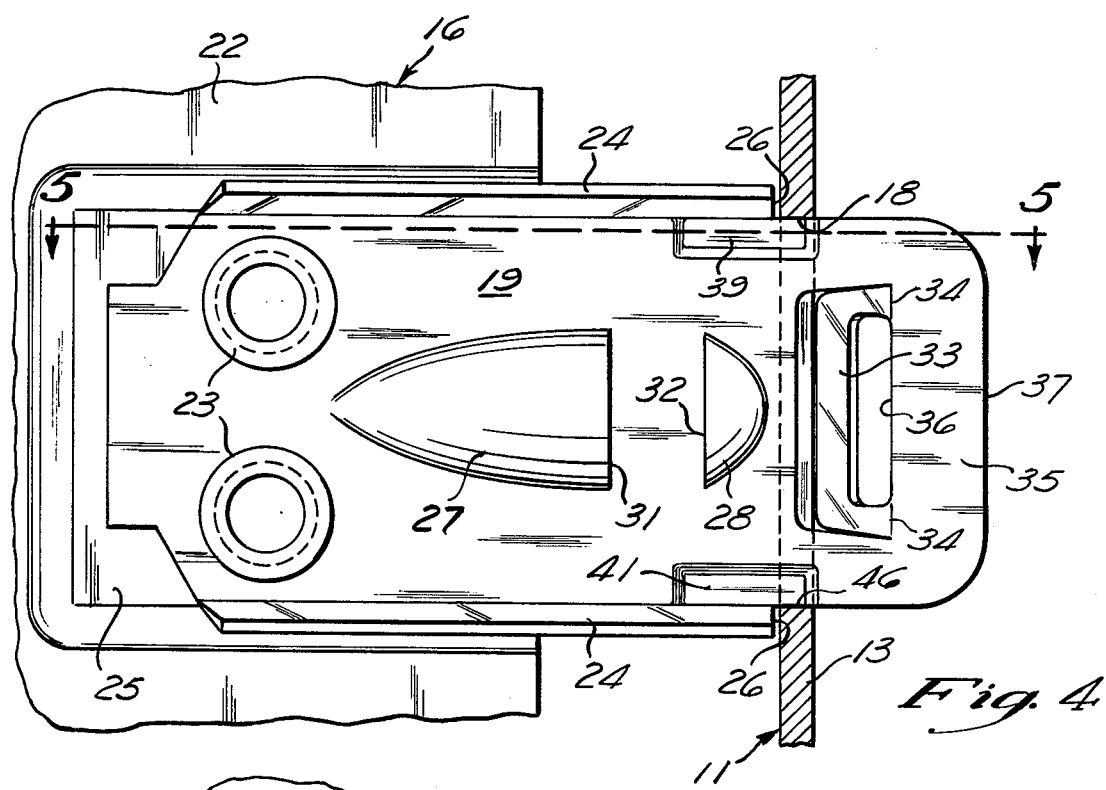
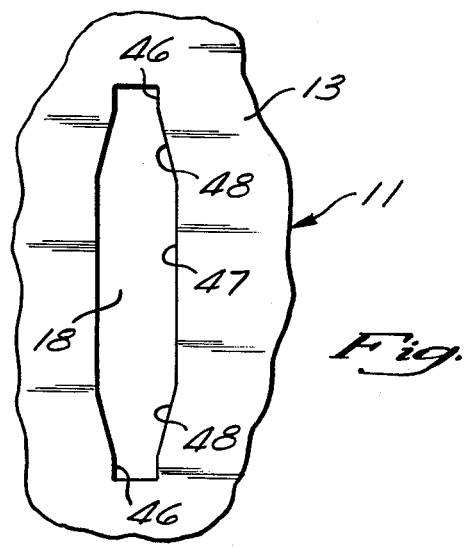

: 
LOCKING CONNECTION FOR SUSPENSION CEILING SYSTEMS

This is a continuation-in-part of the copending application Ser. No. 625,572 filed Oct. 24, 1975.

BACKGROUND OF THE INVENTION

This invention relates generally to suspension ceiling systems and more particularly to a novel and improved grid connection system.

PRIOR ART

Suspension ceilings formed of grids are well known. Examples of such systems are disclosed in the following U.S. Pat. Nos. 3,189,139, 3,221,466, 3,304,684, 3,385,021, 3,501,185, 3,584,904, and 3,746,379. Such systems usually include a grid of inverted T-shapd members in which main parallel runs are suspended from the building structure and cross runs consist of separate cross members extending between and supported at their ends by the associated main run members.

In some systems such as for example, the systems disclosed in the U.S. Pat. Nos. 3,321,879, 3,350,125, 3,378,976 and 3,511,012, the cross members are provided with end connectors which extend into openings or slots in the web of the main run members and lock onto such web. In other systems as for example the type illustrated in the U.S. Pat. No. 3,084,401, the connectors of the cross member extend through the opening or slot and lock with each other and not with the web of the main run members.

In some other instances, as for example in the U.S. Pat. Nos. 3,501,185 and 3,565,474, the systems provide connectors wherein the connectors lock with each other and also lock with the web of the main run member.

In many instances, the assembly of the connector requires the assembler to insert the end connector into the slot in some special position and to roll, turn, or laterally move the connector and web relative to each other into their final assembled position. In other instances, it is possible to commence insertion of a connector member improperly so that difficulty is encountered unless the installer is skilled. Although installers often become adept in assembling such systems, it requires the assembler to be trained and requires considerable practice before the assembler is able to consistently and quickly accomplish the assembly.

SUMMARY OF THE INVENTION

There are a number of aspects to the present invention. In accordance with one aspect of the invention, a connector system is provided in which the grid connectors for the suspension ceiling or the like is provided with identical end connectors which are assembled through a slot opening in the main member web by straight-in insertion to the assembled position, and wherein the connectors provide a positive mechanical connection between the two connectors themselves. This connection positively positions and locks the adjacent cross members in a predetermined position and against axial movement in either direction from such position. With such structure, variations in the web thickness of the main members does not produce a problem, since the positioning of the cross members with respect to each other is independent of the thickness of the main member web.

In accordance with another aspect of this invention, two similar interengaging locking systems are provided between each pair of end connectors with one on each side of the web. They cooperate to provide a very strong locking action which provides positive, stable and precise positioning of the cross members relative to each other.

In accordance with another aspect of this invention, each end connector is provided with a lateral tab which is engageable with the side of the web remote from the associated cross member to independently lock each connector to the web of the main member. This additional locking tab permits locking assembly of a single end connector within the web slot. This is an advantage in normal assembly, since one connector can be assembled in the slot and will remain in position until and while a second connector is inserted from the opposite side of the main member web. It is also an advantage when the grid system is interrupted, for example, by a lighting fixture or the like and only one connector is inserted within a given slot. The lateral tab is also arranged so that it prevents insertion of a second connector on the wrong side of a previously installed first connector.

In one illustrated embodiment a tongue and socket structure is provided to greatly increase the ability of the connection to withstand separating forces when for example the system is subjected to seismic shock. With this embodiment the tongue functions to prevent the lock from separating under very high load conditions.

The illustrated embodiments of this invention provide precise positioning of the connected parts, ease of installation without requiring a high installer skill and high strength in the connected joint.

BRIEF DESCRIPTION OF THE DRAWINGS

FIG. 4 is an enlarged side elevation of the end connector illustrated in FIG. 1 through 3;

FIG. 5 is a plan view taken along 5—5 of FIG. 4 with a mating connector illustrated in phantom in the installed position;

FIG. 6 is an enlarged fragmentary view showing the shape of the slot opening into which the connectors are assembled;

DETAILED DESCRIPTION OF THE DRAWINGS

Figure 1:
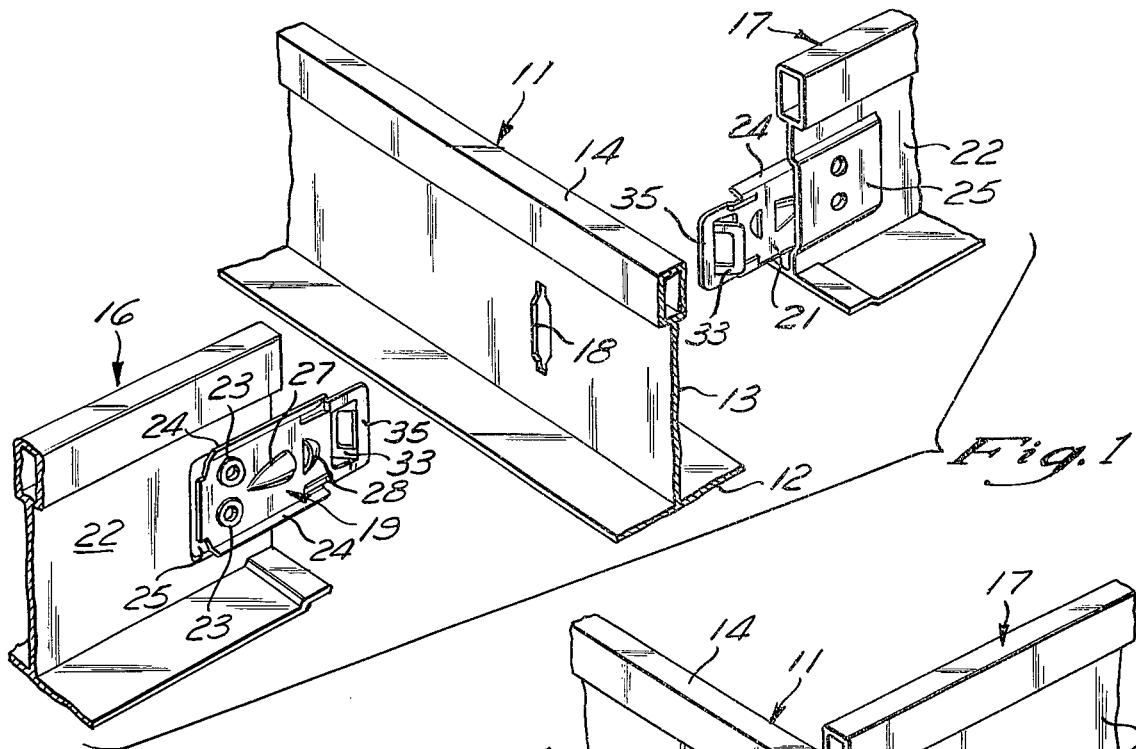
FIG. 1 is a perspective view of a portion of the main run member and the ends of associated cross members before the end connectors are inserted into the web slot in the main member.
Figure 2:
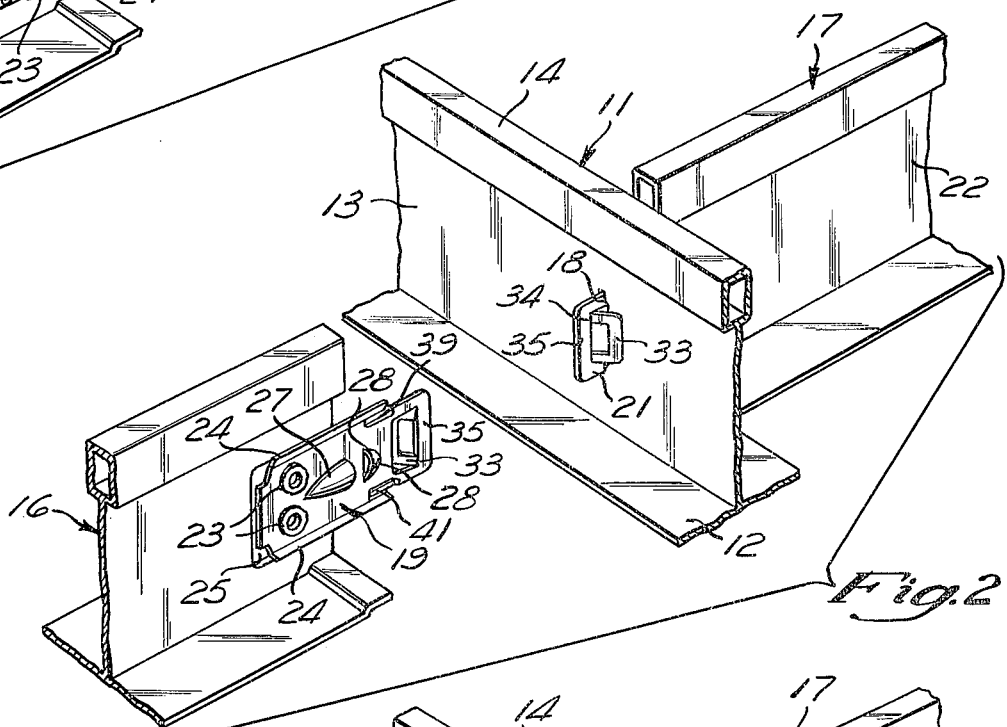
FIG. 2 is a perspective view similar to FIG. 1 illustrating a point in the assembly in which the first connector is moved into its installed position, but the second connector remains uninstalled.
Figure 3:
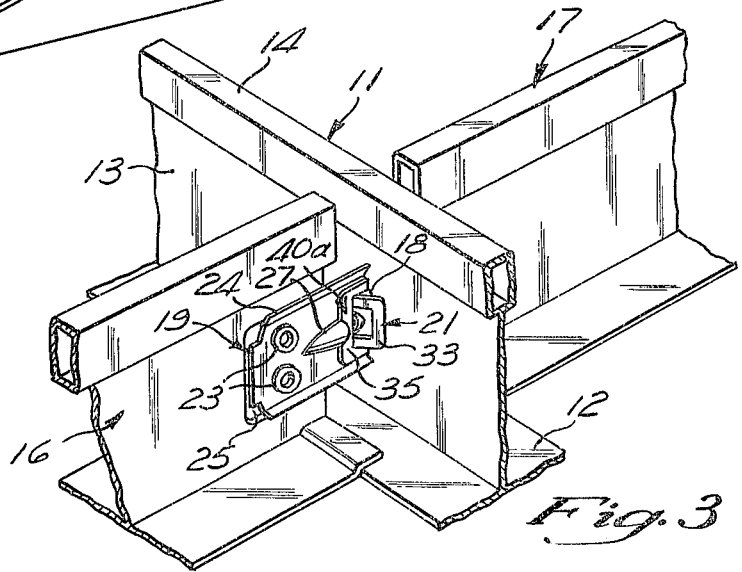
FIG. 3 is a perspective view similar to FIGS. 1 and 2, illustrating both end connectors in the fully installed position.

FIGS. 1 through 3 illustrate the steps in the assembly of a preferred suspension ceiling grid structure in accordance with the present invention. Only a single junction or connection is illustrated in the drawings for purposes of clarity. However, it should be understood that a completed grid system includes a plurality of parallel main runs which consist of end connected main members suspended from the building structure in the manner illustrated generally in the patent to Findlay, U.S. Pat. No. 3,084,401. The disclosure of such patent is incorporated by reference herein. A plurality of cross members extend laterally between and are supported at their ends by the adjacent main run members. After installation, lateral runs perpendicular to the main runs are provided by aligned cross members.

In the drawings, a segment of a main run member 11 is illustrated having an inverted T-shaped section with a horizontally extending flange 12, extending from opposite sides of a central web 13. A box section 14 is formed on the upper edge of the web 13. Also illustrated are a pair of cross members 16 and 17, which are assembled on the main member 11 from opposite sides in a manner described in detail below. Normally, the cross section of the cross members is similar to or identical with the cross section of the main member 11. The shape of the members 11, 16 and 17 may be produced in any one of a number of ways, such as by extrusion, forming sheet stock, or by other suitable means. Since the manner of forming the members themselves forms no part of this invention, they have been illustrated as single wall structures for purposes of simplification.

A slot-like opening 18 is formed in the web 13 of the main member to receive an end connector 19 mounted on the cross member 16 in face-to-face relationship with an end connector 21, provided on the end of the cross member 17. The two end connectors 19 and 21 are identical in structure so the structural detail of only one should be understood to apply to the other, and similar reference numerals are used to designate similar parts on each end connector.

The end connector 19 is a stamped part formed of sheet metal stock as a separate stamping and is mounted on the web 22 of the cross members 16 by rivet-like projections 23. It should be understood, however, that if desired, the end connector could be formed of the web material of the cross member 16 and not as a separate part. The end connectors 19 and 21 are mounted in offset portions 25 in the web of the cross members 16 and 17 so that the engaging faces of the assembled connections are aligned with the central plane of such webs to insure alignment of the connected cross members.

Referring to FIGS. 4 and 5, the end connector 19 is provided with opposed angle flanges 24 along its top and bottom edges to stiffen the end connector. These angle flanges extend to ends 26, which are adjacent to the web 13 of the main member 11 when the end connector is installed. Also formed in the end connector is a pair of teardrop shaped protrusions 27 and 28, which are laterally deformed from the connector material and provide spaced and opposed end surfaces 31 and 32, respectively. The surfaces 31 and 32 are formed by cuts so that they extend perpendicular to the length of the end connector, but the remaining portions of the protrusions 27 and 28 blend from the plane of the connector and are formed by laterally deforming the material of the end connector. The two surfaces 31 and 32 extend perpendicular to the length of the cross members to produce a positive locking action, as discussed in detail below.

A laterally extending tab 33 of generally U-shape, is formed by lancing the end connector. The legs of the tab are joined to the main end connector at a bend 34, and the center section is cut out to provide a strap end portion 35 defined by a first surface 36 and a second surface 37, both of which extend perpendicular to the length of the cross member 16. The spacing between the pairs of surfaces 36 and 37 is arranged so that such surfaces closely fit in between the two opposed surfaces 31 and 32 of a similar connector to mate with and interengage so as to precisely position each associated end connector and to prevent movement of the associated cross members toward and away from the predetermined assembled position.

A pair of lateral projections 39 and 41 are also formed in the end connector at the upper and lower edges thereof, and are located so that they extend into the slot opening 18 when the connector is installed, as illustrated in FIG. 5.

Each end connector 19 and 21 is formed from sheet metal stock which is sufficiently resilient to permit deflection during the assembly of the end connectors in the slot opening of the main member, but is sufficiently deformable to permit it to be easily die cut and shaped to the required configuration.

During the installation of the grid system in accordance with the present invention, the main members 11 are usually installed and supported by any suitable means from the building structure. As illustrated in FIGS. 1 through 3, cross members 16 and 17 are connected to opposite sides of the main member 11. Usually during the assembly, one of the end connectors 19 or 21 is inserted in the opening 18, prior to the other as illustrated in FIG. 2. To accomplish the connection of the end connector 21 and the main member 11, it is merely necessary to push the end member into the opening 18 with a straight-in movement. The insertion is easily accomplished, since it is not necessary to locate the connector in any particular portion of the slot, or to turn or roll the connector during insertion. Since the vertical height of the opening 18 is proportioned to closely fit the end connector 21 forward of the angle flanges 24, the ends 26 engage the web 13 when the end connector 19 reaches its installed position to prevent further insertion.

As best illustrated in FIG. 6, the slot opening 18 is formed with upper and lower end portions 46 and a wider central section 47 joined to the end portions 46 by an inclined section 48. The width of the end portions 46 is selected to closely fit the two connectors in the zone of the projections 39 when the two connectors are fully connected in face-to-face relationship, as best illustrated in FIG. 5. The enlarged central section 47 provides additional clearance to facilitate the insertion of the laterally extending tab 33. The various elements are proportioned so that insertion of the connector 21 into the opening, a tab springs laterally so that its extremity is beyond the opening 18 to prevent removal of the connector 21 from the opening 18. When a single connector is installed in the opening 18, a slight clearance exists between the ends 26 of the angle flanges on one side of the web 13 and the extremity of the laterally extending tab 33 on the other side of the web 13, as best illustrated in FIG. 4. This insures that positioning of the connectors is not affected by variations in web thickness.

The tab functions to lock a single connector within the opening, even when a second connector is not installed. This is desirable, since the preferred connector is capable for use in installations in which a second connector is not assembled in the same opening with the first, such as for example, at locations where a cross run is interrupted by a lighting fixture or the like. A second advantage is derived from providing the lateral tab 33 to hold a single connector in an opening, since there is no danger that the first inserted connector will slip back out of the opening prior to the installation, or during the installation of the second connector within a given opening.

After the first connector end is inserted in the opening, the second connector end is installed or connected by straight-in movement, as illustrated by the comparison of FIGS. 2 and 3. Because the lateral tab 33 of the connector end 21 projects beyond one side of the opening 18, the second connector end 19 can be installed only on the proper side of the first connector 21, which in the illustrated embodiment is on the side of the connector 21 opposite the tab 33 of the connector 21.

As the connector end 19 is inserted into the opening, one face of the connector 19 slides along the corresponding face of the connector 21 and the laterally extending tab 33 of the connector 19 is deflected inwardly as it passes through the opening. Similarly, the end strap portion 35 of the connector end 19 is deflected laterally by the camming action of the protrusion 28 of the connector 21 and the end strap portion 35 of the connector 21 is deflected laterally by the camming action of the protrusion 28 of the connector 19. When the two connectors reach the proper position as illustrated in FIG. 3, the end strap portion 35 of the connector 19 snaps in between the two surfaces 31 and 32 of the connector 21 and the end strap portion 35 of the connector 21 snaps in between the surfaces 31 and 32 of the connector 19. Therefore, the two connectors provide opposed interengaging surfaces which extend perpendicular to the length of each cross member, which surfaces operate to lock the two connectors in a predetermined axial position and prevents movement of either connector in an axial direction toward or away from the other connector. With such structure, each of the connectors is locked to the other connector by two separate locking systems 40a and 40b at two locations with one locking system located on each side of the web 13, and a high mechanical strength is provided by the connection. Lateral separation of the interengaging surfaces is, of course, prevented by the opening 18.

As best illustrated in FIG. 5, the two lateral projections 39 of the two connectors are located within the opening 18 when the two connectors are in their installed position. Such projections 39 have the affect of thickening the connectors so it is not necessary to form the opening 18 with very narrow ends 46. Further, such structure provides additional clearance during the initial insertion, even though the clearance is taken up and a tight assembly is provided when the installation is complete. Preferably, the width of the end portions 46 is selected to provide a slight interference fit so that looseness and rattling cannot occur.

In practice it is desirable to select the dimensions of the connectors so that the lateral tab 33 is spaced from the ends 26 in axial direction by a distance slightly greater than the nominal thickness of the web 13 in which the connectors are to be installed. With such an arrangement, the connector can be easily installed, even when the web 13 of the main member is slightly thicker than the nominal dimension. Further, with the illustrated embodiment, the axial positioning of the two connectors is determined by the connectors themselves, and not by the thickness of the web 13. This is important in many grid installations, since the dimensional variations are cumulative in large grid systems. For example, if the web 13 is only ten thousandths of an inch greater than nominal and there are 20 cross members in each cross run, the accumulated increase in length resulting from the small excess thickness of the web would amount to one quarter of an inch if the axial spacing between the cross members were determined solely by the web thickness.

The precise positioning of the cross members with respect to each other is important in many building installations. For example, it is often necessary to assemble a grid around a building core, which houses the elevators and sanitary facilities of the building. If the axial positioning at each joint is not maintained accurately, difficulty can be encountered when attempting to join grid members around such building cores. With the present invention, the precise axial positioning of one cross member with respect to an associated cross member is controlled by the end connectors themselves and variations in the web thickness of the main members 11 does not alter such positioning.

With the illustrated structure in which the locking of the end connectors in a predtermined position is provided by surfaces which extend perpendicular to the length of the members, forces on the cross member tending to push them either toward or away from each other do not produce any lateral components of force on the interengaging surfaces which would tend to cause them to snap apart. Consequently, the assembled connectors are capable of withstanding high axial forces.

Further, the components of each locking system are strong. The strap portion 35 has high strength since it is supported at each end. Similarly, the surfaces 31 and 32 are very well supported by teardrop shaped protrusions 27 and 28. Consequently, each locking system provides high strength and the two locking systems cooperate to provide a very strong and stable connection.

As described above the embodiment of FIG. 1 through FIG. 6 provides high strength in normal instances since the surfaces 31, 32, 36 and 37 all extend normal to the lengthwise direction of the connector members and there is no camming action present between mating surfaces 36 and 32 when tension forces are applied to the connection. However, in some instances it is possible for the two connectors to move to an angulated position in which the connected parts are not in alignment. Such a condition can occur when the system is subjected to seismic shock during an earthquake or the like.

When the connectors of the first embodiment are angulated, there is a tendency for the engagement of the first surface 36 with the surface 32 to produce a camming action when a separating force is applied. Such camming action results from the curved shape of the protrusion 28. Because of the tendency of the parts to cam apart when the connected parts are angulated, the connection of this first embodiment cannot withstand as high a separating force under such special conditions even though very high strength is obtained under normal conditions in which the connected parts are aligned.

Figure 7:
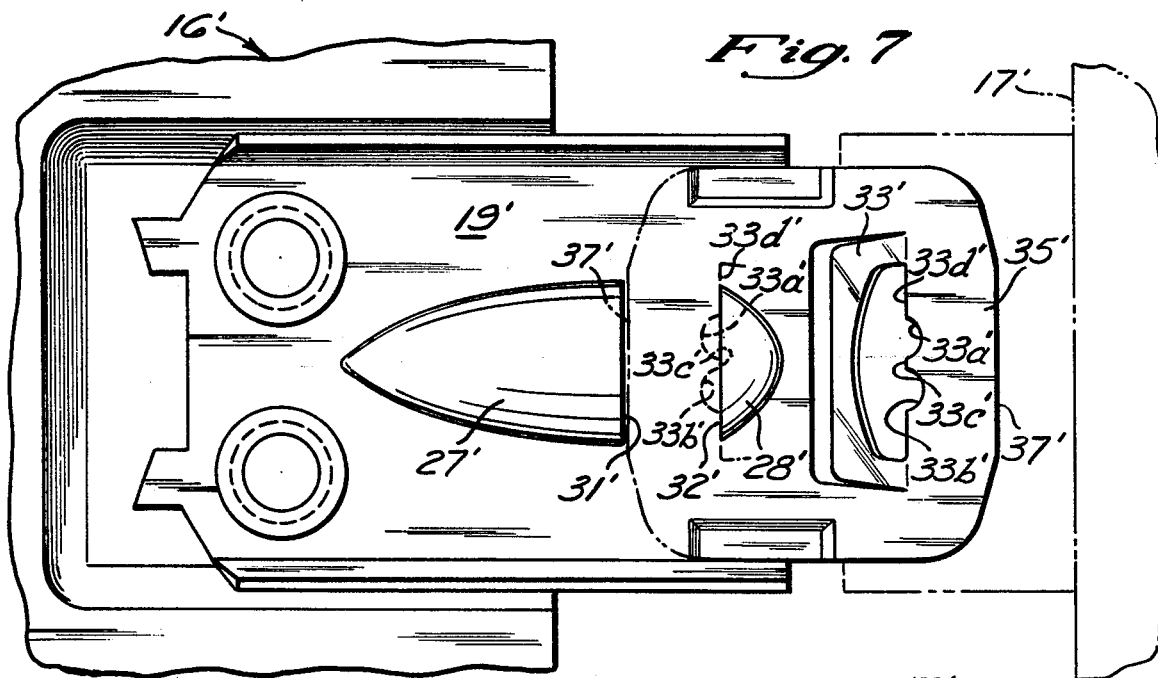
FIG. 7 is a side elevation of a second embodiment connector providing a tongue and socket structure with the connector illustrated in its normal position; and, FIG. 8 is a side elevation similar to FIG. 7 illustrating the connector when the connector parts are turned from direct alignment and the tongue interfits into the socket.
Figure 8:
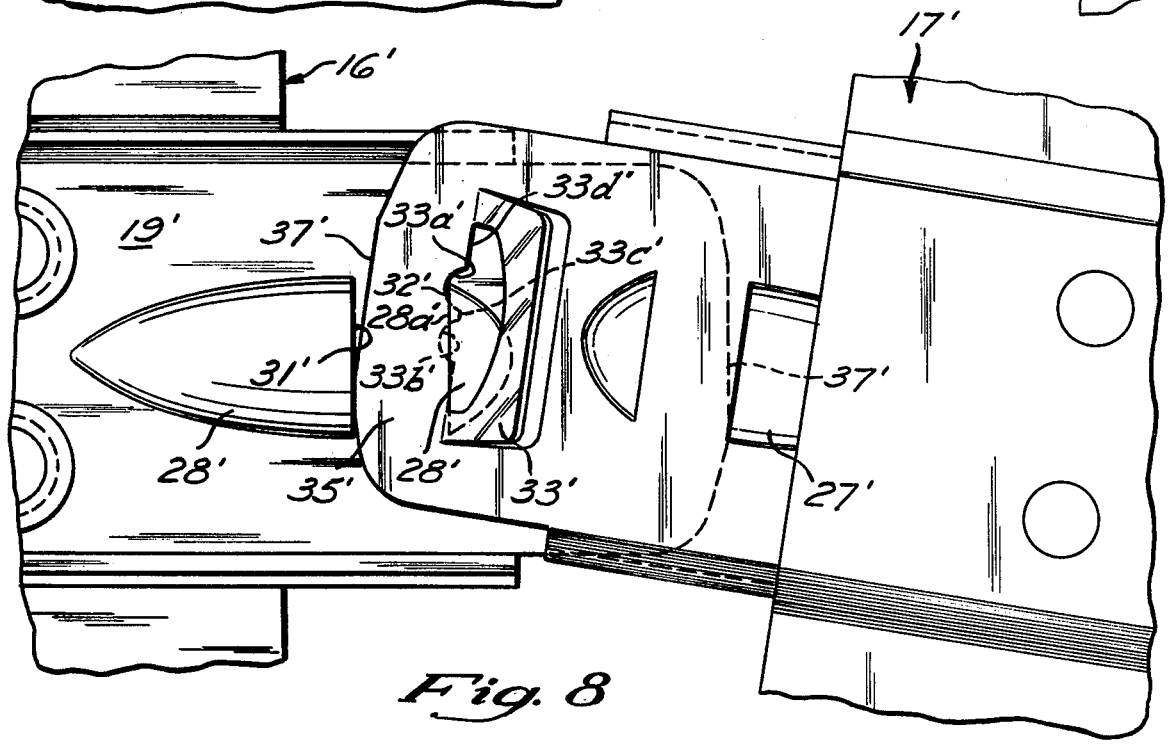

The second embodiment of FIGS. 7 and 8 is therefore preferred for installation where the possibility of seismic shock exists or the possibility of the parts becoming angulated with respect to each other exists for any other reasons. In this embodiment the tongue and socket structure is provided which prevents the parts from camming apart even when they are angulated as illustrated in FIG. 8.

The basic structure of the second embodiment is essentially the same as in the first embodiment. Therefore, similar reference numerals are used to refer to similar parts but a prime (') is added to indicate that reference is made to the second embodiment. In FIG. 7 one of the connector parts of the second embodiment is illustrated in full line and a mating part is illustrated in phantom. The connector 19' is provided with a pair of spaced protrusions 27' and 28' which provide spaced opposed end surfaces 31' and 32'. Here, again, a tab 33' is formed adjacent to the end of the connector which functions in the same manner as the corresponding tab of the first embodiment. Also a strap section 35' provides a second surface 37' which is engageable with the surface 31' of a mating part. The first surface 33d' of the strap 35', however, is modified in this second embodiment by providing two cutout sections 33a' and 33b'. These cutouts are essentially semi-circular in shape and are spaced from each other by a tongue 33c'.

The end of the tongue 33c' is aligned with the remaining portions of the first surface 33d' and the various elements are proportioned so that when two parts are connected and are in direct alignment as illustrated in FIG. 7 by the phantom illustration, the portions of the first surface 33d' outwardly of the two cutouts 33a' and 33b' engage the mating surface 32' when the parts are subject to a load tending to cause separation. Because the tongue 33c' does not project beyond the plane of the outer portions of the first surface 33d'. It does not project into the opening of the socket formed by the end of the protrusion 28'. Consequently, under light separating loads on the connection, the tongue 33c' does not perform any function. However, even when the connected parts are aligned as illustrated in FIG. 7, improved strength to resist separating forces is obtained, since as the load on the connection is increased there is a tendency for the material forming the connection to deform a limited amount with the results that the tongue 33c' projects into the socket formed by the protrusion and prevents lateral displacement of the strap 35'. Consequently, even under straight or aligned conditions, it has been found that the embodiment of FIGS. 7a and 8 is capable of withstanding materially greater separating forces than the first embodiment of FIGS. 1 through 6 and that the connection fails only when sufficient load is applied to actually tear or mutilate the connecting parts.

FIG. 8 illustrates the connections of the second embodiment in a condition in which the two cross member 16' and 17' have been moved to an angulated position with respect to each other and are not in alignment as illustrated in the remaining figures. Such a condition normally does not occur unless the building in which the system is installed is subjected to very unusual forces such as might occur during an earthquake or other unusual conditions such as fire or explosion. In the angulated condition of FIG. 8 the strap 35' of the cross member 17' is laterally moved with a pivot like action from its normal position with respect to the two protrusions 27' and 28'. In this position the cutout 33a' is positioned to receive the end of the surface 32' and the tongue 33c' of the cross member 17' projects into the opening or socket 28a' of the protrusion 28' and mechanically prevents any camming action from causing the two connectors to disengage when a separation force is applied. In fact, the portion of the surface 33d' below the cutout 33b' also tends to project into the socket to further resist any camming like action.

In this embodiment the strap 35' is preferably shaped so that the second surface 37' engages the opposed surface 31' to cause the tongue 33c' to move into the socket as the two parts move to the angulated position illustrated. It should be understood that the strap 35' of the cross member 16' is also positively locked in the similar manner when the two connected parts are angulated as illustrated in FIG. 8.

It has been found in actual tests that connections as illustrated in the second embodiment of FIGS. 7 and 8 are capable of withstanding separation forces, when the two parts are angulated as illustrated in FIG. 8 which are in the range of two or more times the separation force that can be sustained by the embodiment of FIGS. 1 through 6 when such first embodiment is subjected to separating forces while in a similar angulated position. In fact, the structure of the second embodiment can withstand higher separation forces even when angulated than can be normally handled by the first embodiment when the two connecting parts are aligned. It should be understood however, that in normal installations the embodiment of FIGS. 1 through 6 provides more than adequate strength and that such embodiment is completely satisfactory in installations in which the two connected parts are not subjected to angulated conditions of the type illustrated in FIG. 8. In the embodiment of FIGS. 7 and 8, the assembly is the same as in the first embodiment and the tongue 33c' does not interfere in any way with the movement of the strap 33' into its normal position between the two opposed surfaces 31' and 32'.

Although preferred embodiments of this invention are illustrated, it should be understood that various modifications and rearrangements of parts may be resorted to without departing from the scope of the invention disclosed and claimed herein.

What is claimed is:

1. A locking connection for a planar grid system or the like which includes a plurality of parallel first support members and a plurality of second support members which extend perpendicular to and between said first members comprising a web provided by said first members formed with a slot opening therethrough, an end connector on each of said second members, each end connector being proportioned so that two of them are insertable through said slot openings from opposite directions in abutting side-by-side relationship to lock a pair of said second members together on opposite sides of an associated first member, said end connectors each providing an opposed pair of surfaces which extend substantially perpendicular to the associated second members and interlocking with opposed surfaces on the other connector when two end connectors are inserted in opposite directions through said slot, said interlocking surfaces operating to positively position said end connectors and their associated second members in a predetermined axial position and prevent relative axial movement therebetween toward and away from each other, said slot preventing lateral separation of said end connectors and preventing disengagement of said interengaging surfaces, each end connector also including a laterally extending portion which engages said web on the side thereof remote from the associated second member to prevent withdrawal of each end connector from said slot independent of the other connector whereby a single connector may be installed and locked in said slot, said laterally extending portion operating after one connector is installed in said slot to prevent the insertion of a second connector on the incorrect side of said one connector.

2. A locking connection as set forth in claim 1 wherein said end connectors are identical and each end connector provides two pairs of opposed surfaces which interengage with mating surfaces on the other connector to provide two locking systems, one locking system being on each side of said slot opening when two connectors are connected within said slot opening.

3. A locking connection as set forth in claim 2 wherein one pair of opposed surfaces on each end connector is provided by a lateral strap portion at the forward end thereof, and the other pair of opposed surfaces is provided by a pair of lateral protrusions, each strap portion being positioned between the protrusions of the other connector when two end connectors are installed within said slot opening.

4. A locking connection as set forth in claim 3 wherein each end connector is provided with a lateral projection positioned within said slot opening when installed therein, said lateral projections cooperating to cause a pair of end connectors to tightly fit in an associated slot opening.

5. A locking connection as set forth in claim 3 wherein each end connector is provided with stiffening flanges terminating in ends which are axially spaced from said laterally extending portion by a distance greater than the nominal thickness of said web, said flange ends and laterally extending portion cooperating to locate a single end connector in said slot opening.

6. A locking connection as set forth in claim 5 wherein said laterally extending portion is a tab formed with a U-shape and one side of said strap portion extends between the legs of said laterally extending tab.

7. A locking connection as set forth in claim 6 wherein one of said protrusions on each end connector is shaped to cam the strap portion of the other end connector laterally as said connectors are moved toward each other to said predetermined position.

8. A locking connection as set forth in claim 7 wherein said end connectors are separate elements mounted on said second members so that adjacent second members are aligned when their associated end connectors are connected in said slot opening.

9. A locking connection as set forth in claim 3 wherein said strap is formed with a tongue along one surface of said one pair of opposed surfaces, and the associated of said protrusions provides a socket to receive said tongue.

10. A locking connection as set forth in claim 9 wherein said tongue and socket interfit to prevent movement of said second members in a direction away from each other.

11. A locking connection as set forth in claim 9 wherein movement of said second members to a position of non-alignment causes said tongue to enter said socket.

12. A locking connection for a planar grid system or the like which includes a plurality of parallel first support members and a plurality of second support members which extend perpendicular to and between said first members comprising a web provided by said first members formed with a slot opening therethrough, identical end connectors on each of said second members, each end connector being proportioned so the two of them are insertable through said slot openings from opposite directions in abutting side-by-side relationship to lock a pair of said second members together on opposite sides of an associated first member, said end connectors each providing a lateral strap portion to provide a first pair of opposed surfaces and a pair of opposed protrusions providing a second pair of opposed surfaces, said strap portion of each end connector being located between the protrusions of the other end connector when two end connectors are installed in said slot opening and providing two locking systems with one located on each side of said web, each locking system including interengaging opposed surfaces which cooperate to positively position said end connectors in a predetermined axial position and preventing relative axial movement therebetween toward and away from each other, said slot preventing lateral separation of said end connectors and preventing disengagement between said strap portions and protrusions.

13. A locking connection as set forth in claim 12 wherein said end connectors provide separate locking means operable to lock a single end connector within said slot opening.

14. A locking connection as set forth in claim 13 wherein said separate locking means includes a laterally extending tab which also operates to prevent insertion of a second end connector into said slot on the incorrect side of a previously installed end connector.

15. A locking connection as set forth in claim 12 wherein one of said pair of surfaces is provided with a tongue and the associated protrusion provides a socket to receive said tongue.

16. A locking connection as set forth in claim 12 wherein one of said protrusions provides a socket, said strap is cut out along one edge in a location to receive a portion of the second surface of said one protrusion, a portion of said strap being movable into said socket to prevent lateral separation of said strap and associated protrusion.

17. A suspension ceiling grid comprising a plurality of parallel main grid members cooperating to provide main runs, a plurality of cross members extending between and supported by said main members, said cross members cooperating to provide a plurality of cross runs extending perpendicular to said main runs, each main member providing a slot opening aligned with each cross member, said cross members providing similar end connectors with two of them extending in opposite directions through an associated slot opening in side-by-side relationship, each end connector providing a pair of opposed surfaces extending substantially perpendicularly to the length of its cross member interlocking with mating opposed surfaces on the other end connector to lock adjacent ends of said cross members in a predetermined axial position relative to each other and against relative axial movement toward and away from each other, said slot preventing lateral disengagement between said interengaging opposed surfaces, each end connector providing cam means to laterally displace said pair of opposed surfaces of the other end connector as they move to said predetermined position, said end connectors being formed of a material having sufficient resiliency to permit said connectors to be inserted with straight-in insertion into said slot, to allow said lateral displacement of said opposed surfaces and to cause said opposed surfaces to snap into interengaging relationship when said cross members reach said predetermined position.

18. A suspension ceiling grid as set forth in claim 17 wherein each end connector includes separate locking means operable to lock a single end connector in said slot opening.

19. A suspension ceiling grid as set forth in claim 18 wherein said separate locking means includes a laterally extending tab which prevents insertion of a second end connector into said slot opening on the incorrect side of a first end connector within said slot opening.

20. A suspension ceiling grid as set forth in claim 19 wherein each connector is provided with two pairs of opposed surfaces each of which mates with and interengages a mating pair of opposed surfaces on the other end connector and provides two separate locking systems with one on each side of said slot opening.

21. A suspension ceiling grid as set forth in claim 17 wherein said end connectors provide a tongue and socket structure which interfit at least when said cross members are not aligned to prevent separating forces from disconnecting said end connectors.

22. A locking connection for a planar ceiling grid system which consists of parallel elongated main runs and parallel elongated cross runs extending perpendicular to said main runs comprising a plurality of end connected members providing identical mating end connections, said end connectors including a first lateral surface and a mating protrusion providing a second lateral surface and an axially extending socket, said mating end connectors being assembled by axial movement causing lateral deflection allowing said first lateral surface to pass said protrusion and said second lateral surface and subsequent return to an undeflected state in which said first and second lateral surfaces are in abutting axial alignment, said first lateral surface being provided with an axially extending tongue which axially interfits into said socket when said end connections are subjected to tension forces, interlocking between said first and second surfaces preventing separation of the connected members when subjected to tension forces and said interfitting of said tongue and socket preventing lateral separation of said first and second surfaces.

23. A locking connection as set forth in claim 22 wherein said first surface and the extremity of said tongue are aligned, said tongue being formed by a pair of notches in said first surface, said second surface being curved to provide said socket, movement of said members to a position of nonalignment causing a portion of said second surface to enter one of said notches and movement of said tongue into said socket.

24. A locking connector as set forth in claim 22 wherein means are provided to move said tongue into said socket in response to movement of said members to positions of nonalignment.

* * * * *